United States Patent [19]

Wagenaar et al.

[11] 3,746,935

[45] July 17, 1973

[54] ELECTRICAL BUSHING SUITABLE FOR ATTACHMENT BETWEEN TWO ELECTRICAL APPARATUS ENCLOSURES

[75] Inventors: Loren B. Wagenaar; Walter F. True; Saul Bennon, all of Muncie, Ind.

[73] Assignee: Westinghouse Electric Corporation, Pittsburgh, Pa.

[22] Filed: Feb. 18, 1972

[21] Appl. No.: 227,555

[52] U.S. Cl......... 317/103, 174/11 BH, 174/12 BH, 174/18, 174/31 R, 174/143, 174/DIG. 10
[51] Int. Cl........................ H01b 17/26, H02b 1/00
[58] Field of Search................... 174/11 BH, 12 BH, 174/14 BH, 15 BH, 16 BH, 18, 31 R, 31.5, 142, 143, DIG. 10; 317/103

[56] References Cited
UNITED STATES PATENTS 1,270,850   7/1918   McConahey...................... 317/103
2,047,000   7/1936   Calvert............................. 174/18 X

FOREIGN PATENTS OR APPLICATIONS 777,514   6/1957   Great Britain.................. 174/12 BH

*Primary Examiner*—Laramie E. Askin
*Attorney*—A. T. Stratton and F. E. Browder

[57] ABSTRACT

Bushing apparatus for connecting a high-voltage lead within one enclosure to a high-voltage lead within another enclosure. A center member is connected to each enclosure with a lead tube extending coaxially therethrough. Epoxy casing structures, having a smooth outer surface, are disposed around said lead tube within each enclosure. Means attached to the lead tube ends applies compressive forces on the casings and center member to seal the bushing. Flanges on the center member are used for connecting the bushing body to the enclosures.

4 Claims, 1 Drawing Figure

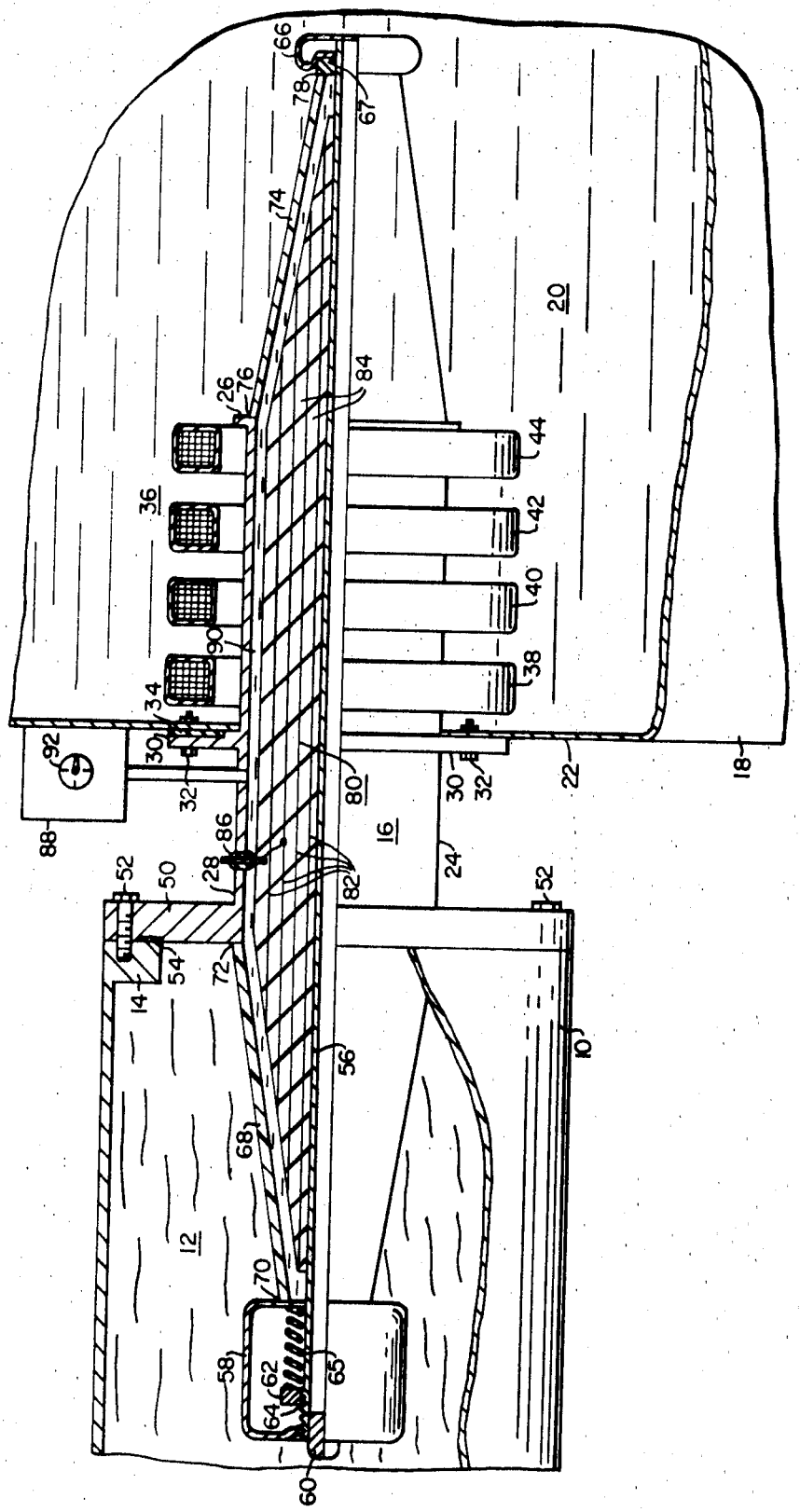

ELECTRICAL BUSHING SUITABLE FOR ATTACHMENT BETWEEN TWO ELECTRICAL APPARATUS ENCLOSURES

BACKGROUND OF THE INVENTION

1. Field of the Invention

This invention relates, in general, to electrical bushings and, more particularly, to electrical bushings for connecting transformer windings to pressurized bus ducts.

2. Description of the Prior Art

Connecting the electrical winding leads of a transformer, reactor, regulator, etc., to another electrical apparatus unit or conductor usually involves an electrical bushing assembly. The bushing is attached to the transformer casing with its internal end connected to the winding lead and its external end connected to the conductor. In some applications, the conductor is housed in a duct which is pressurized with a gaseous dielectric, such as sulfur hexafluoride.

Pressurized bus-conductor ducts present specialized problems in making the electrical connection between the bus-conductor and the winding lead. The lead may be electrically brought through the transformer casing by a conventional bushing assembly. Another bushing assembly is required to electrically bring the bus-conductor through its duct enclosure. Finally, the two bushings are electrically connected by a suitable means.

The use of separate bushings when connecting pressurized bus ducts to transformers necessitates a higher cost when terminating such a system. Additionally, the size of the conventional bushing used on the transformer is large and requires substantial mounting space. It is desirable, and it is an object of this invention, to provide an efficient electrical bushing assembly for connecting a bus-conductor container in a pressurized duct to an internal transformer lead. Another object of this invention is to provide such termination with a single bushing having a smaller size than conventional bushings.

SUMMARY OF THE INVENTION

There is disclosed herein a new and useful bushing assembly for connecting a high-voltage circuit contained within one enclosure to a high-voltage circuit contained within another enclosure. The bushing has a center member, a lead tube, and two casings. The center member is attached to one of the enclosures by a flange thereon with a portion of the center member extending into one of the enclosures. One of the casings and a portion of the lead tube also extend into the same enclosures. A flange connected to an end of the center member is attached to the other enclosure. The other casing and lead tube portion extend into this other enclosure. By attaching both enclosures to the bushing center member, only one bushing is required to make the electrical connection. In addition, the size of one of the bushing casings can be reduced because of the high dielectric strength of the medium adjacent to this casing.

BRIEF DESCRIPTION OF THE DRAWING

Further advantages and uses of this invention will become more apparent when considered in view of the following detailed description and drawing, in which there is shown a partial elevational view, partly in section, illustrating a bushing assembly constructed according to the teachings of this invention.

DESCRIPTION OF THE PREFERRED EMBODIMENTS

Referring now to the drawing, there is shown a bus-conductor duct 10 containing a fluid dielectric 12. The fluid dielectric may be any suitable material, such as sulfur hexafluoride, and can be contained within the duct 10 at a particular pressure value, such as 45 psi. The end of the bus duct 10 includes a flange 14 which provides a suitable surface for attachment to the bushing 16. Although illustrated as a bus-conductor duct, the pressurized duct 10 may be any enclosure containing a fluid coolant dielectric.

The enclosure 18 contains a fluid dielectric 20, such as mineral oil. In oil filled transformers, the pressure value of the dielectric 20 will usually be less than the pressure value of the dielectric 12. The enclosure 18 includes a wall 22 with an opening therein suitable for insertion of the bushing 16.

The bushing 16 includes a substantially cylindrical center member 24 constructed of a high strength material, such as steel. The center member 24 is positioned in the opening of the enclosure wall 22 with the end 26 extending into the enclosure 18 and the end 28 extending out from the enclosure 18. A flange 30 is positioned between the ends 26 and 28. The flange 30 is mounted to the wall 22 by a suitable means, such as by the bolts 32. A gasket 34 is positioned between the flange 30 and the wall 22 to provide a tight seal therebetween.

The region of the center member 24 which is located between the flange 30 and the end 26 has current transformer apparatus 36 disposed thereon for the purpose of measuring the current flowing through the bushing 16. The current transformer 36 comprises the winding sections 38, 40, 42 and 44 which are connected to suitable indicating devices.

A flange 50 is located at the end 28 of the center member 24. The flange 50 has a shape which is similar to the shape of the duct 10. In the embodiment illustrated, both the duct 10 and the flange 50 have a substantially circular shape. The flange 50 is attached to the flange 14 of the duct 10 by the screws 52. A suitable gasket 54, such as a washer shaped neoprene disc, is positioned between the junction of the flanges 50 and 14 to provide a gas tight seal.

A substantially cylindrical lead tube 56 is positioned coaxially and concentrically with the center member 24. One end of the lead tube 56 includes a terminal means comprising a cap 58 which is attached to the lead tube 56. The lead tube contains a lead extension 60 which seals one end of the lead tube 56. A spanner nut 62 is secured to the threaded lead tube 56 by the thread 64. A resilient means, such as the coil spring 65, is located between the spanner nut 62 and the cap 58. The spring 65 is tensioned to produce an axial tensile stress on the lead tube 56. Means, such as soldering or brazing, may be used to seal the cap 58 and the lead extension 60 to the lead tube 56.

In the embodiment shown, the cap 58 does not contain a liquid dielectric. However, it is within the contemplation of this invention that oil, or another fluid dielectric, may be contained within the cap 58. The bus-conductor, which is not shown, may be electrically connected to the cap 58 or to the lead extension 60 to provide the electrical circuit between the lead tube 56 and the bus-conductor.

The other end of the lead tube 56 is terminated by a static shield 66 to which an electrical lead, which is not shown, may be attached. The static shield 66 may seal this end of the lead tube 56 and seal out the fluid dielectric 20. However, it is within the contemplation of this invention that fluid dielectric may be permitted to flow inside the lead tube 56 for cooling purposes. The static shield 66 may be constructed of a metallic material and soldered or brazed to the lead tube 56, or fastened to the casing support 67.

The sealed lead tube 56 is shown as being void of a fluid dielectric such as transformer oil. This provides a cost and weight savings, however, it is within the contemplation of this invention that the lead tube 56 may contain a fluid coolant dielectric.

The casing 68 is positioned between the cap 58 and the flange 50. Casing 68 has a substantially tapered tubular shape with a relatively smooth outer surface. The longitudinal axis of the casing 68 is coincident with the longitudinal axis of the lead tube 56. The casing 68 is constructed of a suitable insulating material, such as an epoxide. Although not illustrated, sealing gaskets with appropriate retainer rings may be located at the ends 70 and 72 of the casing 68 to provide a tight seal.

Absence of sheds which are normally used on bushing casings provide the substantially smooth outer surface of the casing 68. The lack of necessity for sheds is provided by the controlled atmosphere around the casing 68. Since sheds are used to enhance the creepage resistance of bushing casings, and since the dielectric 12 contained in the bus duct is substantially free of matter which promotes creepage, the sheds are not necessary. Additionally, the use of sheds in such a controlled atmosphere can cause detrimental effects. Sheds inherently produce a high-potential gradient at their outermost extension due to their sharp curvature. This high-potential gradient attracts and focuses any contaminants present in the dielectric and increases the rate of deposition of contaminants on the casing structure. Therefore, not only are sheds eliminated from the casing 68 in this invention because of low contamination of the controlled atmosphere surrounding the casing 68, elimination of the sheds is beneficial also from the standpoint of reducing the potential gradient peaks adjacent to the casing 68.

The casing 74 is constructed similar to the casing 68 and is coaxially located with the lead tube 56. The ends 76 and 78 of the casing 74 may have gaskets and retainer rings adjacent thereto for providing a tight seal, although they are not illustrated. Although not illustrated, the casing 68 and/or 74 may have sheds thereon if the fluid dielectric is contaminated.

The tensile stress placed on the lead tube 56 by the spring 65 places a compressive stress on the casings 68 and 74 and on the center member 24. This seats the gaskets between the casings 68 and 74, the center member 16, the cap 58, and the static shield 66. In normal manufacturing, the stresses are established before the cap 58 is rigidly attached to the lead tube 56.

A condenser 80 is disposed within the sealed bushing 16. The condenser 80 includes a plurality of condenser elements 82 disposed concentrically around the lead tube 56 with a suitable insulating material 84, such as kraft paper, disposed between the elements 82. The condenser elements 82 are constructed of a suitable conducting material, such as metal foil. A tap terminal 86 is connected to a condenser element and provides means for supplying power to external control and measuring equipment. The expansion chamber 88 allows the dielectric 90, which is sealed within the bushing 16, to expand without damaging the bushing. The gauge 92 indicates the dielectric level and provides means for detecting a leak in any of the bushing seals.

By placing the bus duct around the outside portion of the bushing 16, it is possible to shorten the length of this portion due to the higher dielectric strength of the medium adjacent the bushing casing 68. Contamination of the dielectric 20 by the dielectric 12 can only result if more than one bushing seal fails. That is, the dielectric 12 must leak into the dielectric 90 and then leak into the dielectric 20. With two interfaces separating the dielectrics 12 and 20, dielectric contamination is very unlikely. A leak in one interface or seal would be indicated by the dielectric level gauge 92 and would permit proper maintenance before the other interface leaks. A dielectric level or pressure alarm system may be used to indicate a leak.

The bushing described herein provides an efficient electrical connection between an electrical circuit in one enclosure and an electrical circuit in another enclosure. Since numerous changes may be made in the above described apparatus, and different embodiments of the invention may be made without departing from the spirit thereof, it is intended that all of the matter contained in the foregoing description or shown in the accompanying drawing, shall be interpreted as illustrative rather than limiting.

We claim as our invention:

1. A bushing assembly for electrically connecting a high-voltage electrical lead contained within a first enclosure to a high-voltage electrical lead contained within a second enclosure, said first and second enclosures having fluid dielectric therein, said bushing assembly comprising first and second casing portions, a center member having a first flange attached to said first enclosure and a second flange attached to said second enclosure, said first and second casing portions being disposed in rigid relationship with said center member, resilient means for forcing said first and second casing portions toward said center member, said first casing portion being located within said first enclosure, said second casing portion being located within said second enclosure, said bushing assembly having means providing two interfaces between the dielectric contained within said first enclosure and the dielectric contained within said second enclosure.

2. The bushing assembly of claim 1 wherein the first and second casing portions have substantially smooth outer surfaces, the dielectric contained within said first enclosure comprises sulfur hexafluoride gas, and the dielectric contained within said second enclosure comprises mineral oil.

3. A bushing assembly for electrically connecting a high-voltage electrical lead contained within a first enclosure to a high-voltage electrical lead contained within a second enclosure, said first enclosure containing a first fluid dielectric at a first pressure value, said second enclosure containing a second fluid dielectric at a second pressure value, said first pressure value being greater than said second pressure value, said bushing assembly comprising a center member having first and second ends, said center member having a substantially cylindrical shape with a first flange located at said first end and a second flange located between said first and second ends of said center member, said first flange being sealingly attachable to said first enclosure, said second flange being sealingly attachable to said second enclosure, a substantially cylindrical lead tube having first and second ends, said lead tube being positioned coaxially with said center member, first terminal means attached to said first end of said lead tube, a first casing having a substantially tapered tubular shape, said first casing being coaxially disposed around said lead tube and located between said first terminal means and said first end of said center member, second terminal means attached to said second end of said lead tube, a second casing having a substantially tapered tubular shape, said second casing being coaxially disposed around said lead tube and located between said second terminal means and said second end of said center member, said first terminal means including resilient means for producing compressive forces between said terminal means, said casings, and said center member.

4. A bushing assembly for electrically connecting a high-voltage electrical lead contained within a bus duct to a high-voltage electrical lead contained within a power transformer, said bus duct containing sulfur hexafluoride gas, said power transformer containing oil, the pressure of said sulfur hexafluoride gas being greater than the pressure of said oil, said bushing assembly comprising a metallic center member having first and second ends, said center member having a substantially cylindrical shape with a first flange located at said first end and a second flange located between said first and second ends of said center member, said first flange being adapted to sealingly attach to said bus duct, said second flange being adapted to sealingly attach to said power transformer, a substantially cylindrical lead tube having first and second ends, said lead tube being positioned coaxially with said center member, a stress graded insulation structure coaxially disposed around said lead tube, said insulation structure including a plurality of cylindrical condenser elements, tap means connected to one of said condenser elements, first terminal means attached to said first end of said lead tube, a first casing having a substantially tapered tubular shape with a substantially smooth outer surface, said first casing being constructed of an epoxy material and being coaxially disposed around said lead tube and located between said first terminal means and said first end of said center member, second terminal means attached to said second end of said lead tube, a second casing having a substantially tapered tubular shape with a substantially smooth outer surface, said second casing being constructed of an epoxy material and being coaxially disposed around said lead tube and located between said second terminal means and said second end of said center member, current transformer means disposed on said bushing between said second flange and said second end of said center member, said first terminal means including resilient means for producing compressive forces between said terminal means, said casings, and said center member for providing a sealed space within said bushing assembly, said sealed space containing oil.

* * * * *